(12) United States Patent
Jones (10) Patent No.: US 6,729,359 B2
(45) Date of Patent: May 4, 2004

(54) MODULAR ON-BOARD INERT GAS GENERATING SYSTEM

(75) Inventor: Philip E. Jones, Naples, FL (US)

(73) Assignee: Shaw Aero Devices, Inc., Naples, FL (US)

( * ) Notice: Subject to any disclaimer, the term of this patent is extended or adjusted under 35 U.S.C. 154(b) by 0 days.

(21) Appl. No.: 10/308,971

(22) Filed: Dec. 3, 2002

(65) Prior Publication Data

US 2004/0000353 A1 Jan. 1, 2004

Related U.S. Application Data

(60) Provisional application No. 60/392,909, filed on Jun. 28, 2002.

(51) Int. Cl.[7] .................................................. B65B 1/04

(52) U.S. Cl. ........................ 141/1; 141/64; 244/135 R (58) Field of Search .............................. 141/1, 62, 63, 141/64, 94, 198, 95; 244/135 R; 96/4–9

(56) References Cited

U.S. PATENT DOCUMENTS

| | | |
|---|---|---|
| 3,776,164 A | 12/1973 | Westrum |
| 4,378,920 A | 4/1983 | Runnels et al. |
| 4,556,180 A | 12/1985 | Manatt |
| 5,069,692 A | 12/1991 | Grennan et al. |
| 5,131,225 A | 7/1992 | Roettger |
| 5,918,679 A | 7/1999 | Cramer |
| 6,012,533 A | 1/2000 | Cramer |
| 6,343,465 B1 | 2/2002 | Martinov |

*Primary Examiner*—Steven O. Douglas
(74) *Attorney, Agent, or Firm*—Morgan, Lewis & Bockius LLP (57) ABSTRACT

A modular, on-board, inert gas generating system for aircraft is disclosed in which main components such as a heat exchanger, filter and air separation module are provide in a modular unit sized to provide predetermined flow of nitrogen-enriched air to the aircraft spaces to be inerted. For different inert gas requirements, for example in larger aircraft, multiple modular units may be provided without redesigning the basic system. A method for inerting fuel tanks, cargo holds and other void spaces using the modular approach is also disclosed.

48 Claims, 6 Drawing Sheets

MODULAR ON-BOARD INERT GAS GENERATING SYSTEM

This application claims priority pursuant to 35 U.S.C. §119(e)1 to U.S. Provisional Patent Application Ser. No. 60/392,909 filed Jun. 28, 2002.

FIELD OF THE INVENTION

This invention relates to a method and apparatus for improving aircraft safety. More specifically, it relates to an apparatus and method for preventing combustion in aircraft fuel tanks and cargo spaces by supplying inert gas.

BACKGROUND OF THE INVENTION

Military aircraft have used On-board Inert Gas Generating Systems (OBIGGS) for some years to protect against fuel tank explosions due to undesired phenomena, such as penetration from small arms fire. Military aircraft are not the only aircraft that would benefit from OBIGGS. For example, investigations into the cause of recent air disasters have concluded that unknown sources may be responsible for fuel tank ignition and explosion. Subsequently, OBIGGS has been evaluated as a way to protect commercial aircraft against such fuel tank explosions started by unknown ignition sources.

OBIGGS protects against fuel tank explosions by replacing the potentially explosive fuel/air mixture above the fuel in the tanks (the ullage) with an inert gas (usually nitrogen—$N_2$). The nitrogen is generated by separating oxygen from local, ambient air and pumping the inert product into the tanks.

In previous applications, OBIGGS has proved relatively unreliable, heavy, and costly for both initial acquisition and operation. Furthermore, military aircraft systems often have the strict requirements that derive from military flight profiles that include high-rate descent from high-altitude flight. Applications of OBIGGS to commercial aircraft would benefit by considering the fact that a typical flight profile for the commercial application has a less demanding requirement for the system because commercial aircraft do not descend at such rates.

Thus, there is a need for a gas generation and inerting system that minimizes the quantity and complexity of sub-components (particularly moving parts). The system should also consider a typical commercial aircraft flight profile and take advantage of the reduced descent rates (compared to military aircraft).

SUMMARY OF THE INVENTION

The present invention provides an apparatus and method for reducing the possibility of combustion in aircraft fuel tanks by replacing air in the ullage of the fuel tank with an inert gas that has been separated from the engine bleed gas. The apparatus includes an air separation module, a filter, and a heat exchanger. In one preferred embodiment, at least the air separation module, filter, and/or heat exchanger are provided in a modular unit, which may be contained in a single housing. Each modular unit is designed to provide predetermined NEA flow. In order to accommodate different inerting requirements of different size aircraft, multiple modular units may be employed.

The method of the present invention includes displacing the atmosphere in the ullage of a fuel tank with a non-combustible gas. In one preferred embodiment, a high-purity non-combustible gas is introduced to the ullage at a low flow rate when external air is in slow influx to the ullage, and alternately a lower-purity non-combustible gas is introduced at a higher rate when external air is in high influx to the ullage. In one embodiment of the invention the non-combustible gas is generated from aircraft engine bleed air. Preferably, the introduction of high-purity non-combustible gas occurs during take-off and level flight of an airplane and introduction of the lower-purity gas occurs during descent of the airplane. In an alternative embodiment, the system is sized to provide a single purity level and flow rate under all operating conditions, thereby eliminating the need for various control components.

BRIEF DESCRIPTION OF THE SEVERAL VIEWS OF THE DRAWINGS

The foregoing and other aspects and advantages of the present invention will be better understood from the following detailed description when read in conjunction with the drawings, in which.

DETAILED DESCRIPTION OF THE PREFERRED EMBODIMENTS

Figure 1:
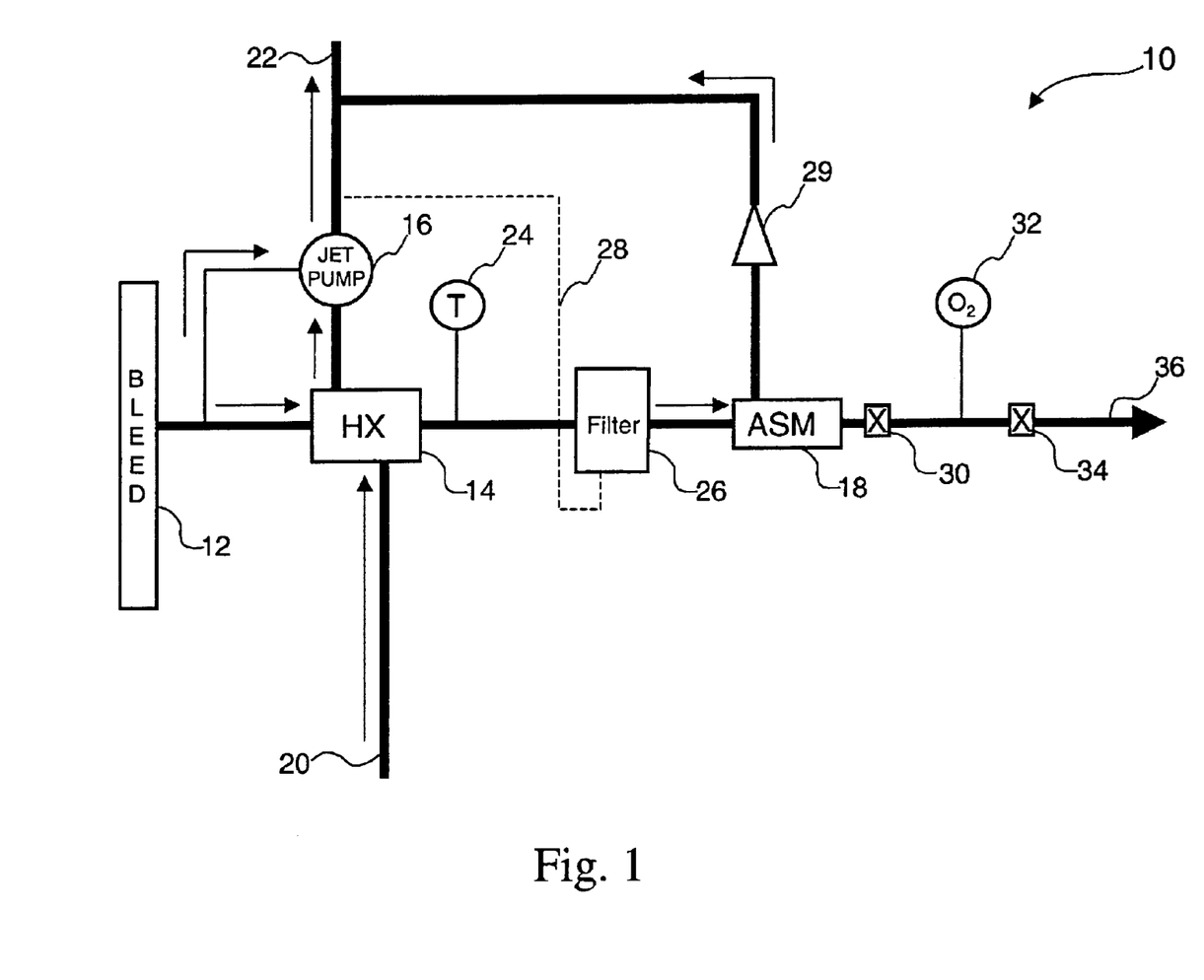
FIG. 1 is a schematic view of one embodiment of a modular on-board inert gas generating system according to the present invention.

As illustrated in FIG. 1, system 10 according to one embodiment of the invention uses aircraft engine bleed air 12 that is supplied under conditions of elevated temperature and elevated pressure to generate gas for inerting aircraft fuel tanks. It will be appreciated by persons skilled in the art that the present invention is equally useful for inerting cargo holds and other void spaces. Engine bleed air is typically supplied from taps in the turbine section of the aircraft engines at temperatures in the range of 300° F.–400° F. and at pressures in the range of 10–45 psig depending on turbine rotation speed. It is typically used as a utility source of pressurized air on board aircraft. System 10 operates whenever bleed air is available and, thus, avoids the use of compressors or complex control valves.

Bleed air 12 is introduced at one end of system 10 and nitrogen-enriched air (NEA) is produced from the other end. Bleed air 12 flows under pressure and temperature to heat exchanger 14. A branch passage taps off a small portion of the pressurized bleed air to power jet pump 16. For efficient operation, depending on size, air separation module (ASM) 18 typically requires input air temperature less than about 200° F. Heat exchanger 14 is therefore used to control the temperature of the engine bleed air fed into ASM 18. Secondary cooling flow 20 is provided to heat exchanger 14 for this purpose. Jet pump 16 may be optionally utilized to provide the cooling flow, which is vented overboard at outlet 22. If desired, temperature sensor 24 may be positioned down stream of the heat exchanger to monitor output temperature and control secondary flow 20 and/or jet pump 16 based on the monitored temperature.

The pressurized air flow from heat exchanger 14 enters filter 26. Filter 26 may comprise multiple filters, such as a coalescing filter to remove particulate contaminants and moisture, and a carbon filter for removing hydrocarbons. Line 28 drains removed moisture and directs it overboard at outlet 22.

After leaving filter 26, the conditioned air enters ASM 18. Typically, ASM 18 provides a total flow in the range of approximately 2–4 lbs./min. Depending on aircraft requirements or other system limitations, other sizes of ASM may be selected. Using conventional hollow-fiber technology, ASM 18 separates the air into oxygen-enriched air (OEA) and nitrogen-enriched air (NEA). In a preferred embodiment, the ASM provides nitrogen-enriched air at flow rates between about 0.5 lbs./min. up to about 2 lbs./min. At the lower flow rates a greater nitrogen purity can be achieved, with oxygen making up only about one percent by volume of the nitrogen-enriched air. At higher flow rates the oxygen content of the nitrogen-enriched air is typically about nine to ten percent by volume. Oxygen-enriched air is piped from ASM 18 overboard through outlet 22. Check valve 29 is provided in the overboard OEA line to prevent back-flow. Nitrogen-enriched air produced by ASM 18 is directed to the fuel tank and/or cargo hold. Orifice 30 is preferably provided downstream of ASM 18 to control the flow rate through the ASM. If desired, a stepped or variable orifice may be provided to control flow rate as described in greater detail below. Optional oxygen sensor 32 may be configured to provide signals representing oxygen content of the NEA. Another optional sensor that may be provided is mass air flow sensor 34. This may be an automotive-style hot wire mass-flow sensor. System outlet 36 directs the NEA to the fuel tank ullage and optionally to aircraft cargo hold as desired.

Figure 2:
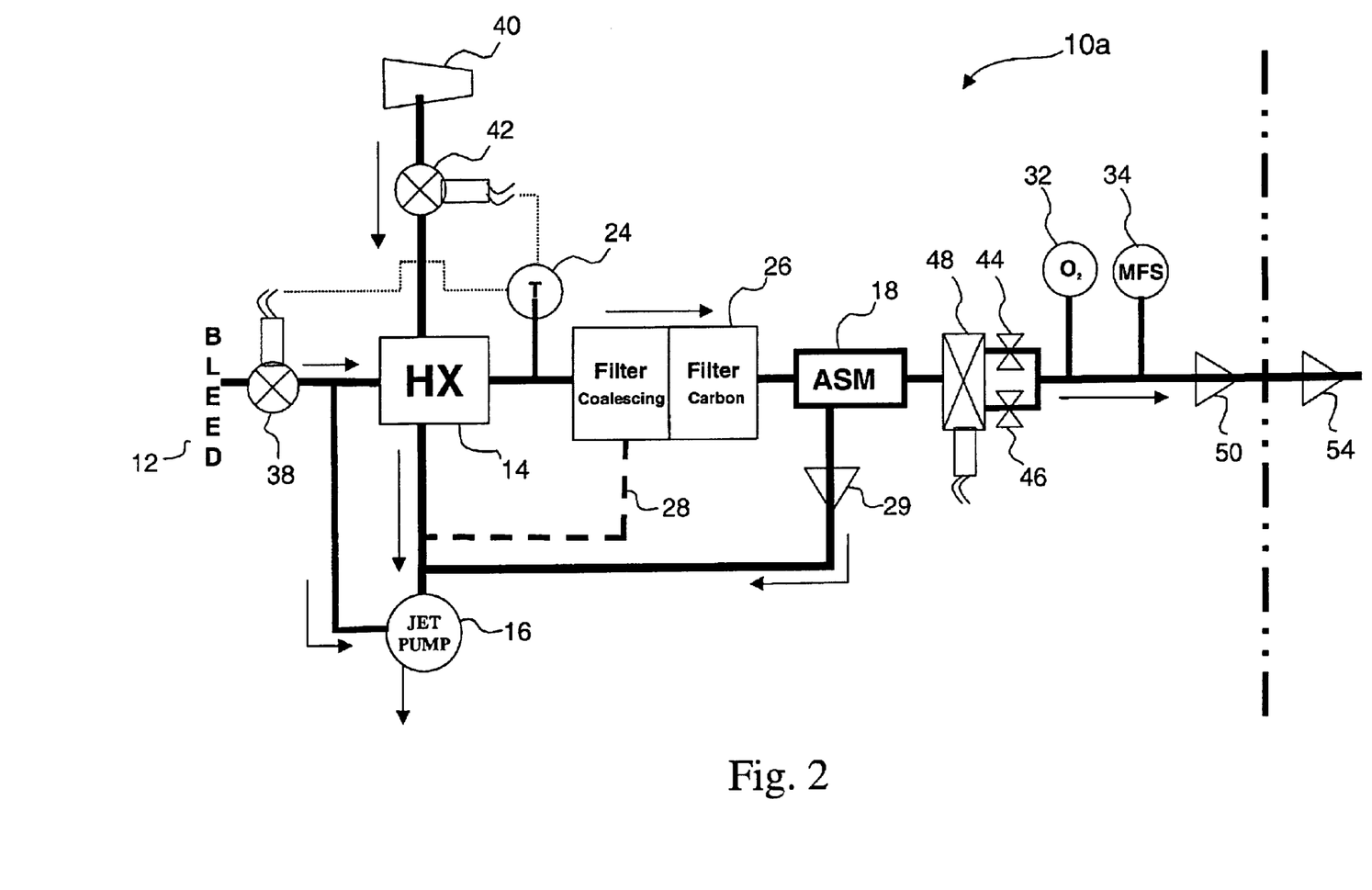
FIG. 2 is a schematic view of an alternative embodiment of the invention.

In an alternative embodiment illustrated in FIG. 2, engine bleed air first passes through an isolation valve 38. Isolation valve 38 permits system 10a to be isolated from the bleed air and, if desired, may be controlled by signals from temperature sensor 24. In this embodiment secondary cooling air is provided by an atmospheric inlet or scoop (ram air) 40. Secondary cooling air may also be provided by an NACA scoop. Secondary cooling air passes through temperature modulation valve 42, which also may be controlled by temperature sensor 24. Alternatively, temperature control of the primary bleed air flow may be achieved through a modulated by-pass flow arrangement (described in detail with reference to FIG. 2A). Secondary cooling air obtained from scoop 40 typically will have a temperature ranging from about −60° F. to 110° F. or greater, depending on the environmental conditions experienced by the aircraft. The secondary air flow again passes through heat exchanger 14, optionally assisted by jet pump 16. Operation of filter 26 and ASM 18 is essentially as described above. In this exemplary embodiment, an orifice is provided with two steps or as a stepped choke valve. For example, a first orifice 44 presents an opening of a first size and second orifice 46 presents an opening of a second size. The orifice seen by the NEA flow is determined by orifice selector 48, which may be a motor actuated valve. The orifice selector is utilized to control the flow rate as described below. NEA exiting the system optionally passes through a first check valve 50, after which it is directed through the fuel tank or cargo hold bulkhead 52. A second check valve 54 may be provided before the NEA is injected into the fuel tank or cargo hold.

The embodiments of the present invention as described above take advantage of characteristics of ASM 18 to produce higher purity NEA (lower $O_2$ content) when flow is restricted. Flow may be restricted using down stream orifices or back pressure. In the embodiments utilizing the variable orifices, preferably two different restrictions are used. Other numbers might be used if warranted by system performance and requirements. Generally, a high restriction provides low flow and high purity, and a low restriction provides a higher flow and low purity. These embodiments rely on existing aircraft vent systems to provide normal tank inward and outward venting while mixing the NEA in the tank ullage or cargo hold space. A high NEA outlet purity combined with a longer flow time will result in an ullage gas with a higher NEA purity. During the climb and cruise portion of a flight, the high purity (low flow) NEA is delivered to the fuel tank. This stores a high nitrogen concentration gas in the fuel tank ullage. During the descent portion of the flight, in which more air vents into the fuel tank as altitude decreases, the orifice is set to provide a lower restriction and higher flow, thus producing a lower purity NEA but at greater volume. However, because high purity NEA is already stored in the fuel tank ullage, air forced in through tank vents during descent simply serves to decrease the nitrogen purity. When supplemented by the high flow low purity NEA provided during descent, the ullage maintains a nitrogen purity sufficient to maintain the inert condition. Given the typical commercial flight profile, although the nitrogen level decreases during aircraft descent, with an appropriately sized system nitrogen levels can be maintained at an inert level through aircraft landing.

In further alternative embodiments, the system of the present invention may be designed to eliminate components such as sensors, variable orifices and the jet pump, thereby further simplifying the system and increasing reliability. In one embodiment, orifices 44 and 46, and selector valve 48 are eliminated by sizing the system to meet extreme operating conditions at all times. This may be accomplished by sizing the system to provide sufficient NEA during climb and cruise operation, so that the oxygen level in the ullage remains at below a critical level during descent and landing. Typically, the critical oxygen level will be less than about 10%–14% oxygen, more particularly less than about 12% oxygen. For example, if a system using the multiple orifices as described above were sized to provide NEA at 0.5 lbs/min with 1% oxygen during climb and cruise, in eliminating the orifices the system may be sized to provide NEA continuously with about 2% oxygen at a slightly higher flow rate. Factors considered include fuel tank size and aircraft flight profile. The system is then designed to, in effect, store high purity NEA in the fuel tank ullage so that upon inflow of air during descent the critical oxygen level is not exceeded before aircraft operation ceases after landing.

In another embodiment, jet pump 16 may be eliminated by sizing the system to rely only on ram air from scoop 40 for secondary cooling flow. This has the advantage of further simplifying the system by removing another component. This advantage must be balanced with the need for additional ground service equipment to provide cooling for testing and maintenance when the aircraft is not in flight.

Another variation involves the removal of temperature sensor 24 and temperature modulation valve 42. In this embodiment, a maximum hot temperature is assumed based on the expected operating conditions. ASM 18 is then sized to provide the required purity of NEA based on an input temperature at the assumed maximum.

Oxygen sensor 32 and mass flow sensor 34 also may be eliminated if system health monitoring is only to be performed on the ground using ground service equipment.

These alternatives for reducing system complexity may be employed alone or in any combination. Exact sizing of the system in the various alternatives described will depend upon the inerting needs and flight profile of the particular aircraft in which the system is to be mounted. A person of ordinary skill in the art will be able to match the system to the aircraft inerting needs based on the disclosure contained herein.

Figure 2A:
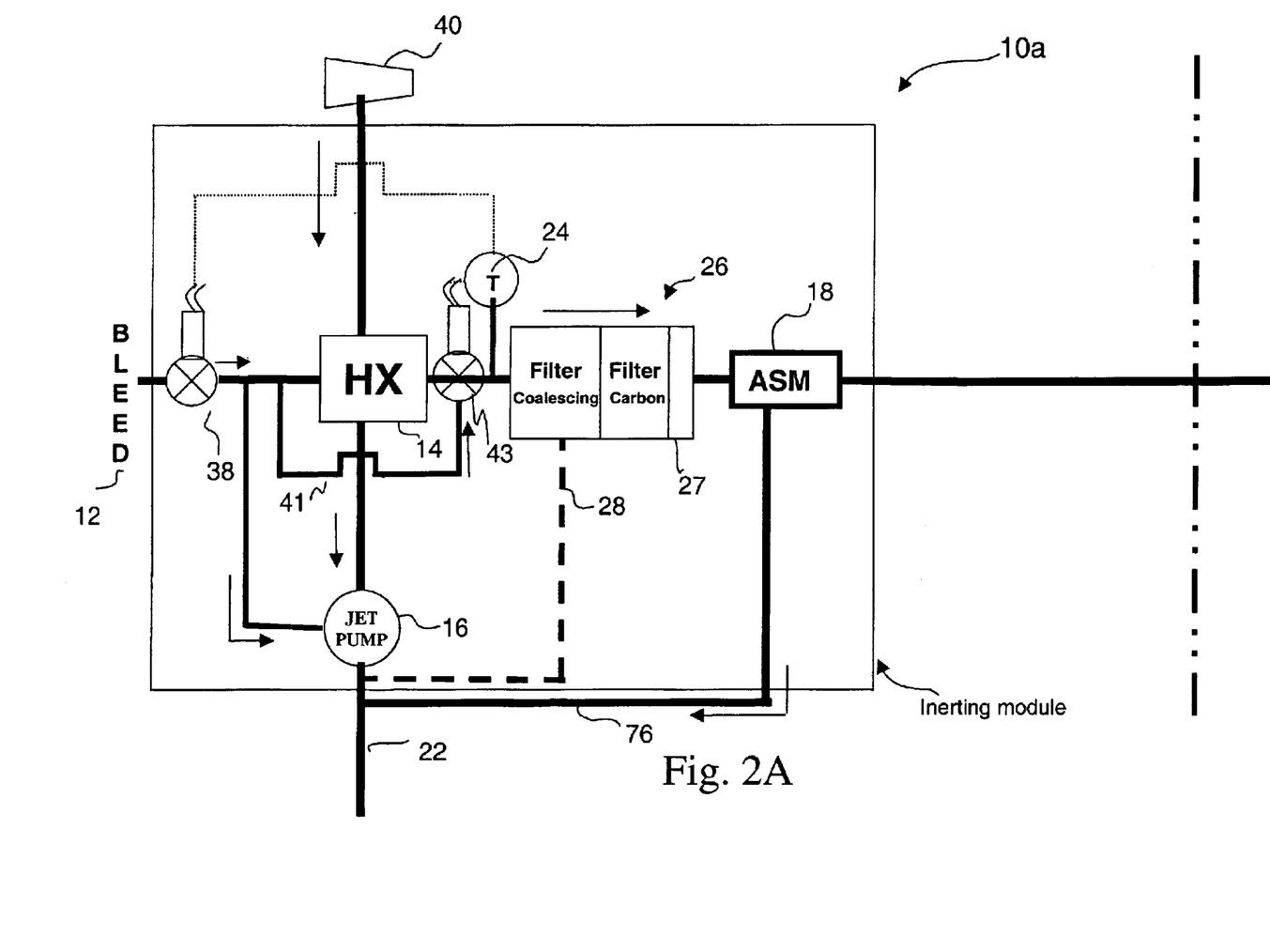
FIG. 2A is a schematic view of a further alternative embodiment of the invention.

In FIG. 2A, a further alternative embodiment of the invention uses primary heat exchanger bypass flow control to control the temperature of the air entering the ASM inlet. Bypass valve 43 controls the air flow to heat exchanger 14 by controlling the amount of permitted bypass flow. Bypass valve 43 modulates incrementally between closed, causing all bleed air to flow through heat exchanger 14, and open, allowing the unrestricted bypass of bleed air around heat exchanger 14. The air flow allowed to bypass heat exchanger 14 follows bypass conduit 41 to the air conduit upstream of temperature sensor 24 and filter 26. Temperature sensor 24 is, therefore positioned to determine the temperature of air entering filter 26 and ASM 18. That temperature is used to direct bypass valve 43 to open and allow an appropriate amount of air to flow around heat exchanger 14 so that the temperature of the air entering filter 26 and ASM 18 is within a desired temperature range. Bypass valve 43 is preferably a phase-change direct acting mechanical sensor and flow control valve. Temperature modulation valve 42 (FIG. 1) and the corresponding control capability are added for additional temperature control if desired.

As also shown in FIG. 2A, filter 26 may include three sections. As previously described, filter 26 may contain a coalescing and solid containment HEPA filter section, for removing particles and water, and a carbon filter section for hydrocarbon removal. In this embodiment, the filter also includes an additional HEPA filter 27, similar to the first filter section, to prevent carbon filter bits from flaking off the previous filter section and traveling to ASM 18. Subcomponents downstream of ASM 18 may be eliminated as shown in FIG. 2A to reduce cost and complexity. In this embodiment the OEA outlet 76 exits the module to combine with the cooling air flow downstream of the jet pump 16. The filter drainpipe 28 also merges with the cooling air flow downstream of the jet pump 16, but does so within the modular assembly. The embodiments shown in FIG. 2A are otherwise as described with reference to FIG. 2.

Figure 3:
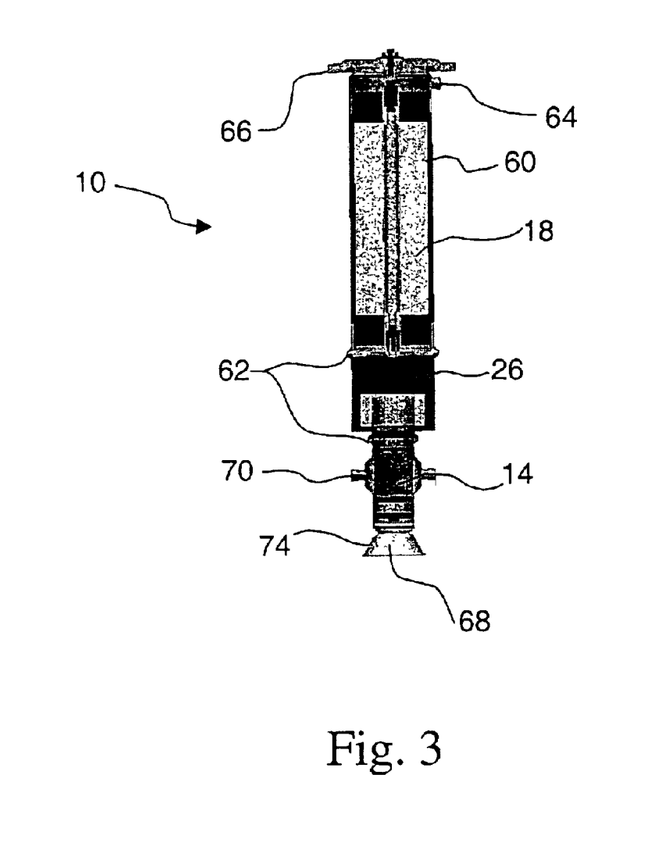
FIG. 3 is a cross-sectional view of a modular system according to the invention.
Figure 4:
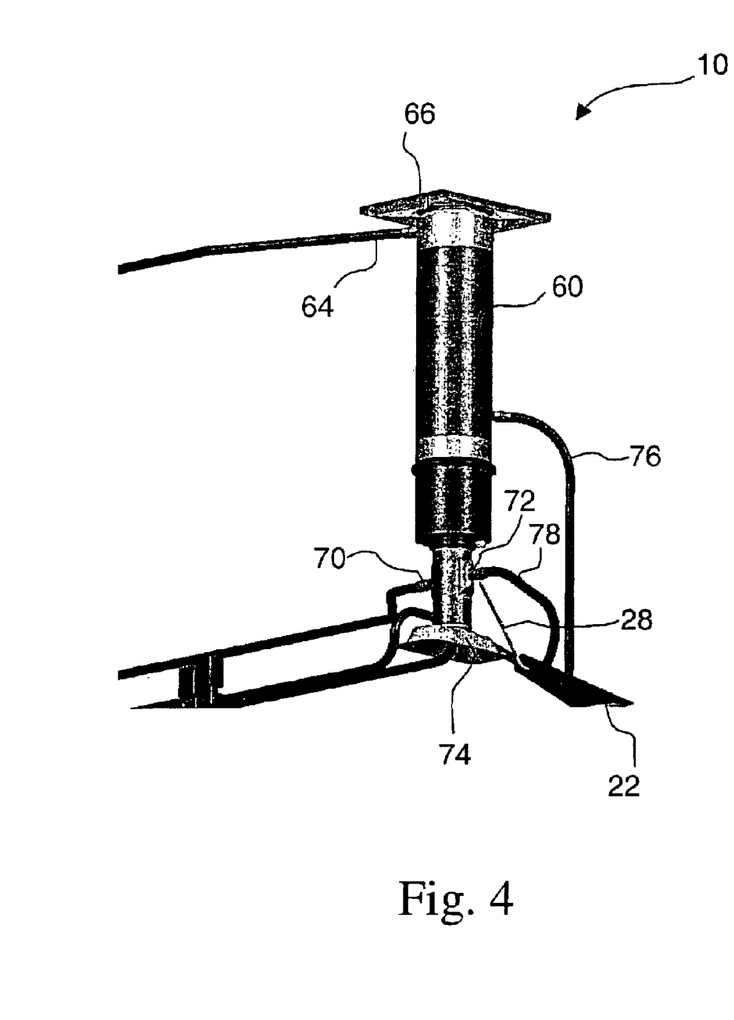
FIG. 4 is a perspective view of an embodiment of the invention.

In a further preferred embodiment of the invention, system 10 is provided as a modular assembly as shown in FIGS. 3 and 4. In one embodiment, components such as ASM 18, filters 26 and heat exchanger 14 are provided within common housing 60. Alternatively, housing 60 may encompass only the ASM and filters, with the heat exchanger mounted thereon to form a single modular unit. For example band clamps 62 may be provided between ASM 18 and filter 26, and filter 26 and heat exchanger 14 to secure the components together.

At the outlet side, NEA outlet port 64 communicates with the fuel tank ullage. An upper mounting bracket 66 may be provided for securing the unit in an appropriate aircraft space. At the inlet side, inlet 68 receives engine bleed air 12 and directs it toward heat exchanger 14. Secondary air inlet 70 provides a secondary cooling air flow and outlet 72 communicates with overboard outlet 22. Lower mount 74 also may be provided for securing the unit. As shown in FIG. 4, OEA outlet pipe 76, secondary air flow pipe 78 and filter drainpipe 28 all lead to overboard outlet 22. Oxygen and mass flow sensors may be provided as part of the modular unit, or separately provided, depending on space and installation requirements. Similarly, the orifice and associated control valve may be included in the modular system.

The single-housing design thus facilitates a simple, lightweight configuration that minimizes both acquisition, in-service and certification costs by eliminating many of the sub-components previously required in such systems. By eliminating sub-components the single-housing design will also minimize installation costs when compared to the current distributed component approach. The single-housing design also improves reliability. In a preferred embodiment, the filter is arranged to be an easily replaceable, disposable cartridge, thereby enhancing maintainability.

Figure 3A:
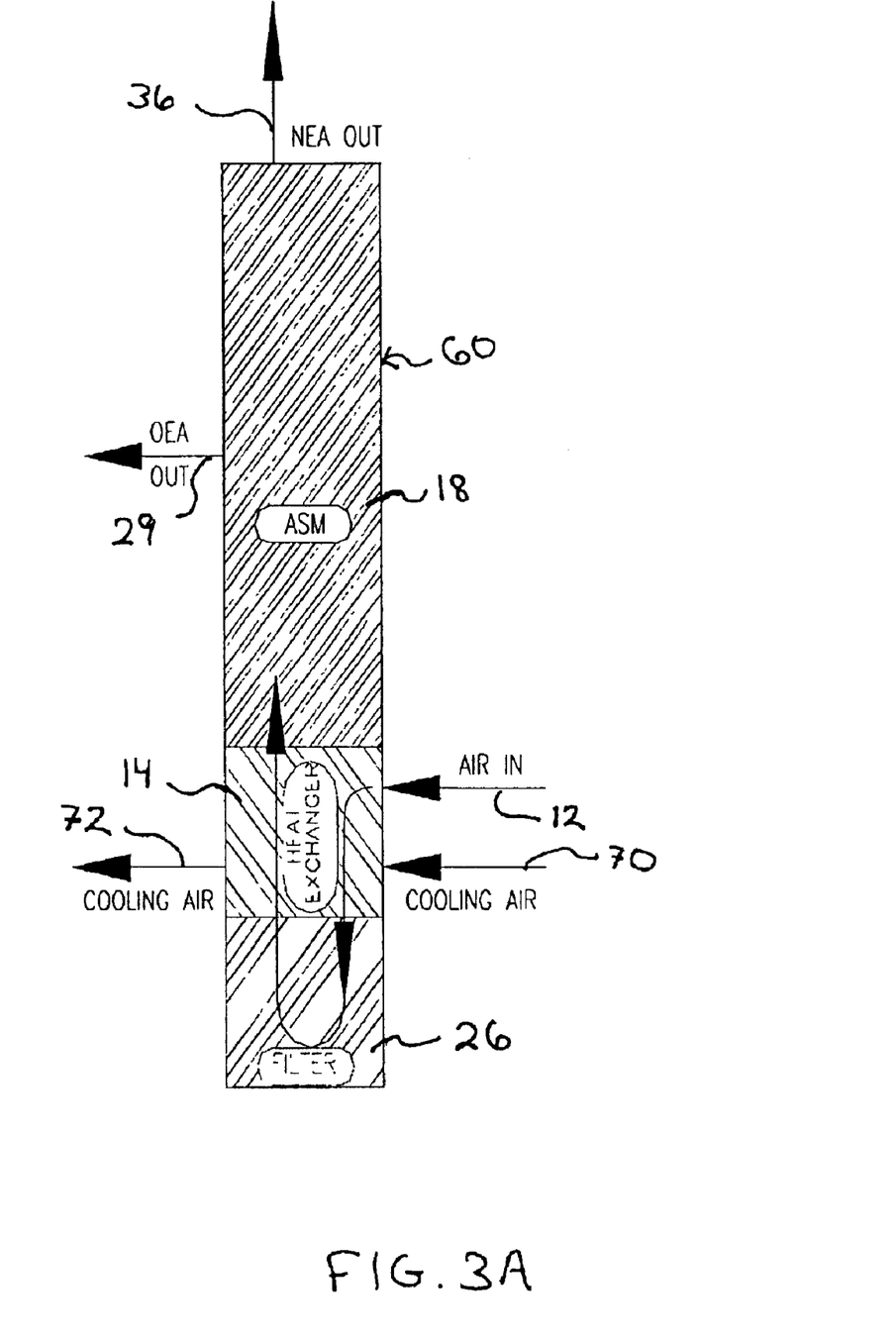
FIG. 3A is a cross-sectional view of another modular system according to the invention.

FIG. 3A shows an additional preferred embodiment of a modular assembly with components contained within a housing 60. In this embodiment, the components are arranged so that heat exchanger 14 is between filter 26 and ASM 18. Among other advantages, depending on installation requirements, this arrangement provides better access to filter 26 for maintenance purposes. FIGS. 1 and 2 still describe the function of this embodiment, with the internal plumbing of the various air flows configured to accommodate the component arrangement in FIG. 3A.

Using the modular approach as described, a module may be designed to provide particular, predetermined NEA flow and multiple modules employed to meet higher flow rate requirements. For example, the individual module may be sized to meet the inerting requirements of a particular customer's smallest aircraft. For larger aircraft of the same customer, instead of redesigning the module, multiple modules are employed to meet the higher flow rate requirements. In this manner, inventory and maintenance costs are reduced because only one type of equipment is required to service an entire fleet of aircraft of different sizes.

Figure 3B:
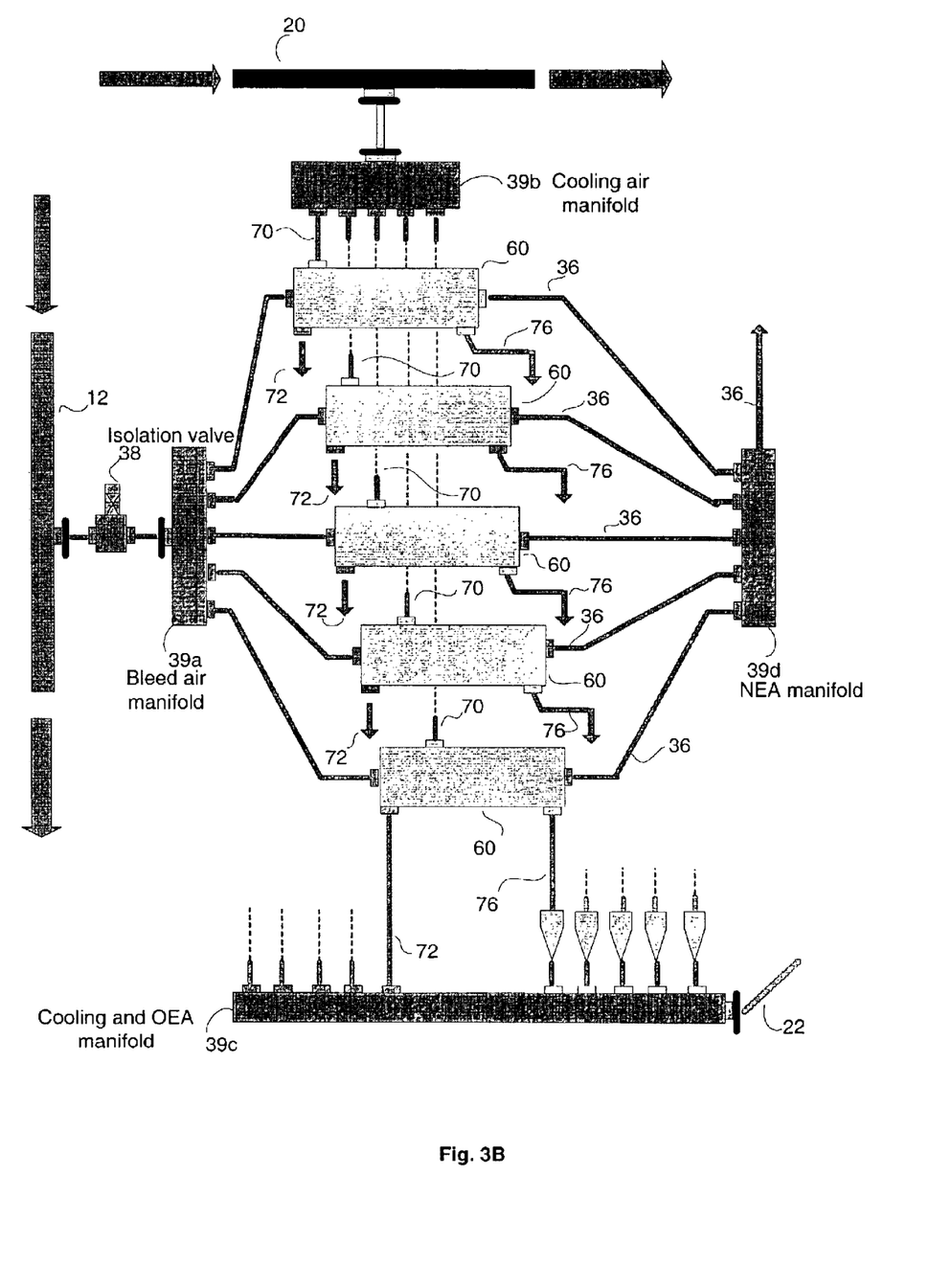
FIG. 3B is a schematic view of a modular system employing multiple modules according to the invention.

FIG. 3B shows one possible arrangement of a modular assembly employing multiple modules. In this embodiment, five housings 60 each contain an ASM 18, heat exchanger 14, and filter 26, as depicted in either of FIG. 3 or 3A. The housings are plumbed together in parallel. Bleed air 12 is provided to each heat exchanger 14 through a single isolation valve 38 and a manifold 39a. Similarly, manifold 39b provides cooling flow 20 to heat exchanger 14 and manifold 39c collects both the OEA and the post-heat exchanger cooling air flow and directs it overboard 22. NEA is collected by manifold 39d and directed to system outlet 36 and the fuel tank ullage.

A further embodiment of the invention boosts system flow performance by tapping bleed air from the high-pressure segment of the aircraft's air cycle machine (ACM). Aircraft environmental control systems often use an air compressor to increase bleed air pressure and temperature in the ACM. This can be used alone or in conjunction with a turbocharger to apply a significantly higher pressure to the ASM. The higher pressure increases the flow and/or purity performance of the ASM, resulting in a smaller and less costly ASM for equivalent system performance. Alternatively, for larger aircraft, fewer ASM's may be required using this embodiment, again resulting in reduced costs and reduced complexity.

The apparatus and method of the present invention provide a more satisfactory OBIGGS for a number of reasons. The modular approach to the design of the equipment reduces acquisition and installation costs. The cartridge-style filter with quick-release installation features, together with high MOBIGGS reliability due to reduced complexity, also reduces operational costs. The methodology of increasing NEA purity in the tank ullage during cruise, together with increased flow/lower purity NEA injection during descent gives all of the benefits of a traditional OBIGGS system with a much smaller, lighter, less costly, more reliable system.

I claim:

1. An inerting system, comprising:
   a filter configured to be connected with a source of pressurized air; and
   an air separation module mounted to the filter to form a modular unit, said air separation module receiving conditioned air from the filter and generating a flow of nitrogen-enriched air of at least one predetermined flow rate and oxygen purity level.

2. The inerting system of claim 1, wherein said modular unit is enclosed in a housing.

3. The inerting system of claim 1, wherein said air separation module is sized to meet said predetermined flow rate and purity level without a downstream restriction of the nitrogen-enriched air flow.

4. The inerting system of claim 1, further comprising a heat exchanger mounted in said modular unit in communication with said filter and configured to be connected to the source of pressurized air, thereby providing temperature conditioned air to the filter.

5. The inerting system of claim 4, wherein said air separation module, said heat exchanger, and said filter are enclosed in a housing with said heat exchanger disposed between said filter and said air separation module.

6. The inerting system of claim 4, wherein said heat exchanger communicates with a secondary source of cooling air for cooling said pressurized air.

7. The inerting system of claim 6, wherein said modular unit further comprises:
   a temperature sensor configured to monitor a temperature of the temperature conditioned air; and
   a temperature modulation valve configured to control a flow of the secondary source of cooling air based on said temperature.

8. The inerting system of claim 6, wherein said modular unit further comprises:
   a temperature sensor configured to monitor a temperature of the temperature conditioned air; and
   a jet pump configured to control a flow of the secondary source of cooling air based on said temperature.

9. The inerting system of claim 6, wherein said heat exchanger and air separation module are sized to meet said predetermined flow rate and purity level without a temperature sensor in the air flow through the system.

10. The inerting system of claim 6, wherein said cooling air is provided by a ram air source.

11. The inerting system of claim 6, wherein said cooling air is provided by a NACA air scoop.

12. The inerting system of claim 6, further comprising a jet pump communicating with the heat exchanger and driving said cooling air.

13. The inerting system of claim 1, wherein said filter comprises a coalescing filter and a carbon filter placed in series.

14. The inerting system of claim 1, further comprising at least one orifice disposed in the nitrogen-enriched air flow.

15. The inerting system of claim 13, wherein said orifice is disposed in said housing.

16. The inerting system of claim 1, wherein the source of pressurized air comprises aircraft engine bleed air.

17. The inerting system of claim 16, further comprising an isolation valve disposed between the engine bleed air source and the modular unit.

18. The inerting system of claim 16, wherein the system is mounted in an aircraft having a requirement for nitrogen-enriched air inerting gas, said system comprising a number of said modular units producing a combined flow rate sufficient to meet said requirement.

19. The inerting system of claim 18, wherein said air separation module in each modular unit is sized, in combination with all other modular units, to meet said requirement without a downstream restriction of the nitrogen-enriched air flow.

20. The inerting system of claim 18, further comprising a heat exchanger mounted in said modular unit in communication with said filter and configured to be connected to the engine bleed air source, thereby providing temperature conditioned air to the filter.

21. The inerting system of claim 20, wherein said heat exchanger and air separation module in each modular unit are sized, in combination with all other modular units, to meet said requirement without a temperature sensor in the air flow through each modular unit.

22. A modular system for inerting void spaces in aircraft, comprising at least one modular unit, wherein a modular unit is configured to receive engine bleed air from the aircraft and to deliver a flow of nitrogen-enriched air of at least one predetermined flow rate and oxygen purity level to a space to be inerted, the modular units being mounted in the aircraft and communicating with said space in a number sufficient in combination to meet a nitrogen-enriched flow requirement for inerting said space.

23. The modular system of claim 22, wherein a plurality of modular units are provided to meet the nitrogen-enriched flow requirement for inerting said space.

24. The modular system of claim 22, wherein said at least one modular unit is contained within a housing.

25. The modular system of claim 22, wherein said at least one modular unit comprises:
   a filter configured to receive the engine bleed air; and
   an air separation module mounted to the filter to produce said nitrogen-enriched air flow.

26. The modular system of claim 25, wherein said modular unit further comprises a heat exchanger configured to receive the engine bleed air, said heat exchanger communicating with the filter to provide a flow of temperature conditioned air thereto.

27. The modular system of claim 26, wherein said heat exchanger is situated between said air separation module and said filter within said housing.

28. The modular system of claim 26, comprising a plurality of modular units and further comprising:
   an engine bleed air manifold communicating with the heat exchanger of each said modular unit;
   nitrogen-enriched air outlet manifold communicating with the air separation module of each said modular unit;
   oxygen-enriched air outlet manifold communicating with the air separation module of each said modular unit;
   cooling air inlet manifold communicating with the heat exchanger of each said modular unit; and
   cooling air outlet manifold communicating with the heat exchanger of each said modular unit.

29. The modular system of claim 28, wherein said cooling air outlet manifold and said oxygen-enriched air outlet manifold are combined in a single manifold.

30. A modular nitrogen-enriched air producing system, comprising:

a housing;

an air separation module disposed in the housing, said air separation module being configured to separate nitrogen-enriched air from air and having an air inlet and outlets for nitrogen-enriched air and oxygen-enriched air;

a filter disposed in said housing and communicating with the air separation module to provide filtered air to said air inlet; and a heat exchanger disposed in said housing between said filter and air separation module, the heat exchanger having an air inlet and an air outlet communicating with said filter, and a cooling air inlet and cooling air outlet.

31. The modular system of claim 30, wherein the air inlet of the air separation module and the air outlet of the heat exchanger are disposed within said housing.

32. The modular system of claim 31, wherein said nitrogen-enriched air and oxygen-enriched air outlets, said heat exchanger air inlet and said heat exchanger cooling air inlet and outlet pass through said housing.

33. A method for inerting void spaces in aircraft, the aircraft having an inert gas requirement for said inerting, the method comprising:

providing at least one modular unit capable of producing a flow of nitrogen-enriched air of at least one predetermined flow rate and oxygen purity level;

mounting in said aircraft a number of said modular units sufficient to meet the aircraft inert gas requirement with a combination of said predetermined flow rates;

connecting said modular units to a source of air; and connecting an output of each of said modular units to the space to be inerted.

34. The method of claim 33, wherein the modular units are sized to meet said aircraft inert gas requirement without restricting nitrogen-enriched air flow.

35. The method of claim 33, wherein the modular units are sized to meet said aircraft inert gas requirement without sensing temperature of air flow through said units.

36. The method of claim 33, wherein the source of air is engine bleed air.

37. The method of claim 33, wherein each said modular unit comprises:

a filter configured to receive the engine bleed air; and an air separation module mounted to the filter to produce said nitrogen-enriched air flow.

38. The method of claim 37, wherein each said modular unit further comprises a heat exchanger configured to receive the engine bleed air, said heat exchanger communicating with the filter to provide a flow of temperature conditioned air thereto.

39. The method of claim 38, further comprising containing said air separation module, said heat exchanger, and said filter within a housing, wherein said heat exchanger is situated between said filter and said air separation module.

40. The method of claim 38, further comprising:

monitoring a temperature of the temperature conditioned air; and controlling a flow of the engine bleed air based on said temperature.

41. The method of claim 38, further comprising providing secondary cooling air to the heat exchanger.

42. The method of claim 41, further comprising pumping said secondary cooling air with a jet pump, and driving said jet pump with engine bleed air.

43. The method of claim 41, further comprising forcing said secondary cooling air through the heat exchanger with a ram air scoop.

44. The method of claim 41, further comprising forcing said secondary cooling air through the heat exchanger with an NACA air scoop.

45. The method of claim 41, further comprising:

monitoring a temperature of the temperature conditioned air; and controlling a flow of the secondary cooling air based on said temperature.

46. The method of claim 45, wherein said controlling comprises using a jet pump to control the flow of the secondary cooling air.

47. The method of claim 33, wherein the source of air is a high-pressure sector of an air cycle machine.

48. The method of claim 37, wherein said number of said modular units include a plurality of modular units sufficient to meet the aircraft inert gas requirement.

* * * * *